United States Patent [19]

Follmann et al.

[11] Patent Number: 5,162,486
[45] Date of Patent: Nov. 10, 1992

[54] PREPARATION OF SPHERICAL, HARD MONO- OR OLIGODISPERSE PARTICLES OF MELAMINE RESIN

[75] Inventors: Heinrich Follmann, Minden; Dietrich Hoffmann, Roedersheim-Gronau; Wolfgang Sliwka, Weinheim, all of Fed. Rep. of Germany

[73] Assignee: BASF Aktiengesellschaft, Ludwigshafen, Fed. Rep. of Germany

[21] Appl. No.: 575,563

[22] Filed: Aug. 31, 1990

[30] Foreign Application Priority Data

Sep. 1, 1989 [DE] Fed. Rep. of Germany ....... 3929052

[51] Int. Cl.$^5$ ............................................. C08G 4/00
[52] U.S. Cl. ............................................. 528/232
[58] Field of Search ........................ 528/232; 524/723; 525/398 D

[56] References Cited

U.S. PATENT DOCUMENTS

| | | | |
|---|---|---|---|
| 3,428,607 | 2/1969 | Renner | 528/232 |
| 4,183,832 | 1/1980 | Meunier et al. | 524/843 |
| 4,406,816 | 9/1983 | Sliwka | 428/914 |
| 4,540,510 | 9/1985 | Karl | 514/781 |

FOREIGN PATENT DOCUMENTS

| | | |
|---|---|---|
| 118608 | 1/1943 | Australia . |
| 0052710 | 6/1982 | European Pat. Off. . |
| 0054755 | 6/1982 | European Pat. Off. . |
| 0218887 | 4/1987 | European Pat. Off. . |
| 224602 | 7/1986 | German Democratic Rep. . |
| 62-068811 | 3/1987 | Japan . |
| 441272 | 12/1974 | U.S.S.R. . |
| 933666 | 6/1982 | U.S.S.R. . |

*Primary Examiner*—Nathan M. Nutter
*Assistant Examiner*—Jeffrey Culpeper Mullis
*Attorney, Agent, or Firm*—Oblon, Spivak, McClelland, Maier & Neustadt

[57] ABSTRACT

Spherical, hard mono- or oligodisperse particles of diameter from 0.1 to 100 μm are prepared by condensation of partially etherified melamine-formaldehyde precondensates which form a clear solution in water in every ratio, in an aqueous solution of a water-soluble polymer which has strongly acid groups and a K value of from 100 to 160, at pH 3 to 6 and at 20° to 100° C., and condensation of the resulting cloudy solution is continued until the precondensate has been consumed, resulting in a dispersion of the particles. The dispersion is neutralized. The particles can be used in the form of the aqueous dispersion or after isolation from the dispersion.

The particles are spherical, hard and non-swellable and can be used, for example, as sizes for plastics, polishes, delustrants, extruders and/or as pigment.

The process makes it possible to produce particles of predetermined size and size distribution.

7 Claims, No Drawings

PREPARATION OF SPHERICAL, HARD MONO- OR OLIGODISPERSE PARTICLES OF MELAMINE RESIN

Aqueous monodisperse dispersions of micro-particles composed of melamine-formaldehyde resin and the preparation thereof are known. The particle diameter is in the range from 0.8 to about 15 μm.

Monodisperse means within the scope of the present invention that the particles have a very narrow diameter distribution.

Examples of the uses of monodisperse dispersions are in medical diagnosis and for calibrating instruments for the optical and/or electronic determination of particle sizes and distributions thereof.

DD-A-224,602 describes a process for the preparation of monodisperse latices of melamine-formaldehyde resins with particle sizes in the range from 0.1 to 15 μm by polycondensation of melamine and formaldehyde in aqueous medium. This entails methylolmelamines with an average of 1.5 methylol groups per melamine being condensed in an aqueous solution/suspension containing from 5 to 70 g of methylolmelamine per liter at from 70° to 100° C. and at a pH from 3.5 to 6.5. It is possible during or after this concentration—in order to obtain dispersions which are particularly suitable for subsequent uses—for the surface of the particles to be modified by addition of compounds which are capable of condensation, and/or to be labeled by addition of dyes, especially of fluorescent dyes. Modifying agents which are mentioned are compounds which contain amino, carboxyl, sulfo or phospho groups and are capable of condensation.

The process of DD-A-224,602 is a further development of the process disclosed in SU-A-441,272 and 933,666. These SU-A provide the first description of the preparation of monodisperse polymer latices (latices see above) from melamine and formaldehyde. The main advantage of the melamine-formaldehyde resin dispersion is, according to the statements in these SU-A, that the density of the particles contained in the dispersion is greater than 1. This results in considerable advantages in the purification of the dispersions (e.g. by sedimentation). The disadvantages of the products obtained as described in these SU-A are the low stability of the dispersion, and the relatively great dependence of the particle size distribution on the quality of the melamine used and, in particular, on that of formaldehyde. Another disadvantage of the process of these SU-A is that reproducible particle sizes can be obtained only with great difficulty, if at all. The process of DD-A-224,602 is intended to avoid this difficulty by using methylolmelamine which has previously been condensed in an alkaline medium for the preparation of the dispersion in the acid pH range. According to the statements in the DD-A, the dispersions prepared in this way are more stable. The known processes still have many disadvantages and difficulties for industrial preparation and use and accordingly leave much to be desired.

The concentration of the dispersions obtainable by the prior art processes is low in terms of space-time yield, being effectively 4 to 8% by weight.

In the 3 abovementioned processes, the resulting dispersions have to be subjected to elaborate fractionation steps to remove oligomers and possibly also formaldehyde. Only then are the desired monodisperse dispersions obtained.

It is an object of the present invention to provide a straightforward industrial process for the preparation of spherical, hard, solid particles based on melamine and formaldehyde. This object is achieved by the process of the present invention.

The present invention relates to a process for the preparation of spherical, hard mono- or oligodisperse particles which have diameters of from 0.1 to 100 μm, by condensation of melamine and formaldehyde in aqueous medium at pH 3 to 6, which comprises condensing a) in an aqueous solution of a water-soluble polymer which has strongly acid groups and a Fikentscher K value of from 100 to 160 or a viscosity of from 200 to 3000 mPa.s at a shear rate of 489 s$^{-1}$ (measured at 25° C. in 20% by weight aqueous solution at pH 7.0), b) a melamine-formaldehyde precondensate which is partially etherified with $C_1$-$C_4$ -alkanols, forms a clear solution in water in every ratio and has a melamine to formaldehyde molar ratio of from 1:3 to 1:6, c) at from 20° to 100° C., d) neutralizing the dispersion and allowing it to cool and e) isolating the particles if required.

The process according to the invention yields spherical, hard particles which are composed of melamine-formaldehyde resins and have diameters which, owing to particular measures, cover the range from 0.1 to 100 μm and above. Appropriate measures are used to prepare particles with mono-, oligo- or polydisperse diameter distributions. The process of the present invention can be used to prepare aqueous dispersions containing from 1 to 40% by weight, preferably from 8 to 30% by weight, of solid.

The dispersions of fine particles prepared by the process according to the invention have a number of advantages over the substances used to date, by reason of their spherical shape, their hardness, their non-swellability and the possibility of specific adjustment of the particle size and distribution thereof, for a number of uses.

The dispersions resulting from the process of the present invention are very stable and have low viscosity. The dispersions can be dried to give powders, if necessary after reaction of the free formaldehyde, which is formed in the condensation of the melamine-formaldehyde precondensate, with melamine or other substances which react with formaldehyde. These powders are suitable for preparing very low viscosity aqueous or non-aqueous dispersions.

The products can be used in the form of the dispersion or in the form of powders for a wide variety of purposes, for example:

i) as rolling size, e.g. in extrusion processes for producing synthetic, textile or glass filaments;
ii) as polishes and/or cleaners;
iii) latices for calibrating optical and electronic instruments for determining particle size and for counting particles;
iv) as reactive matrix for methods of biological and medical diagnosis;
v) as delustrants, extenders for pigments and as pigment which is able to react with the binder resins.

It is essential for the process of the present invention that:

1) the melamine-formaldehyde precondensate used as starting material is miscible with water in every ratio without cloudiness. These precondensates are obtained by condensation of melamine with formaldehyde in the molar ratio from 1:3 to 1:6 and subsequent partial etherification with $C_1$-$C_4$-alkanols, preferably methanol, and 2the formation of the particles takes place in a clear solution of a polymer which has strongly acid groups, preferably sulfo groups. The concentration of the polymer in the solution of polymer and precondensate is from 1 to 10, preferably from 2 to 5, % by weight.

The polymers must have a Fikentscher K value of from 100 to 160 (measured in aqueous solution) or a viscosity of from 200 to 3000 mPa.s at a shear rate of 489 $s^{-1}$ (measured at 25° C. in 20% strength aqueous solution at pH 7.0). Polymers with a K value of from 100 to 140 or a viscosity of from 400 to 2000 mPa.s are preferred. In this connection, it has been found that as the molecular weight of the polymer increases the size of the particles from the process decreases. Suitable water-soluble polymers having strongly acid groups are, in particular, polymers having sulfo groups, eg. polymers of sulfoethyl (meth)acrylate, of sulfopropyl (meth)acrylate, of vinylsulfonic acid, of maleimide-N-ethanesulfonic acid and of 2-acrylamido-2-methylpropanesulfonic acid, in the form both of the homopolymers and of the copolymers. The polymers are in the form of the free acid or, preferably, of the alkali metal salts or of salts with tertiary amines. Also suitable as polymers with sulfo groups are copolymers composed of the said monomers with sulfo groups and of $C_1$-$C_3$-alkyl acrylates, hydroxy-$C_2$-$C_4$-alkyl acrylates such as methyl, ethyl, n- or i-propyl acrylate, hydroxypropyl acrylate and/or N-vinylpyrrolidone, acrylonitrile or acrylic acid. In the case of the acrylates, the copolymer contains a maximum of 35% by weight thereof. In the case where hydroxyalkyl acrylates or acrylic acid and/or acrylonitrile are also used, there should not be more than 10% by weight or 35% by weight thereof, respectively, based on the total of comonomers. In the case of copolymers with N-vinylpyrrolidone, the content of monomers with sulfo groups is not less than 5 and preferably 30% by weight or above (based on the total of comonomers). Preferred copolymers contain 2-acrylamido-2-methylpropanesulfonic acid as comonomer with sulfo groups. Polymers of 2-acrylamido-2-methylpropanesulfonic acid are particularly preferred because particularly low viscosity dispersions and particles with particularly good properties are formed in solutions of this polymer.

The weight ratio of melamine-formaldehyde precondensate to the water-soluble polymer having acid groups is from 1:0.05 to 1:0.7, preferably from 1:0.1 to 1:0.4, based on the solids content.

By using solutions of the melamine-formaldehyde precondensate of appropriate concentration it is possible by the present process to prepare dispersions with solids contents of from 1 to 40% by weight, preferably from 8 to 30% by weight. In this connection it has been found that, as a rule, the diameter of the particles increases with the concentration of the precondensate.

The condensation of the precondensate is carried out at from 20° to 100° C., preferably at from 25 to 80° C. The condensation can be carried out either at constant or at variable temperature, e.g. increasing temperature.

The condensation of the melamine-formaldehyde precondensate is carried out at from pH 3.0 to 6.0, preferably at pH 3.5 to 5.0. The pH of the aqueous solution can be adjusted using various acids, eg. hydrochloric acid, sulfuric acid, phosphoric acid, p-toluenesulfonic acid, or carboxylic acids such as formic acid, acetic acid or propionic acid. When carboxylic acids are used, it has been found that the rate of condensation increases from formic acid to propionic acid at the same pH. At the same time the diameter of the particles decreases.

The rate of condensation until the melamine-formaldehyde precondensate present in the solution has been used up decreases distinctly as the particle diameter and/or pH increases. Completion of condensation can be tested by acidifying a sample to a pH below 3.5 and condensing further. Dispersions which still contain about 10% by weight or more of the precondensate then show a second fraction of very fine, essentially monodisperse particles. At lower contents it has proven advantageous to increase the rate of the remaining condensation by adjusting the pH down as far as 2 and/or heating to from 60° to 100° C.

Particles with a monodisperse diameter distribution are obtained in the pH range from 3.5 to about 4.5, and the particle diameter increases with the pH. Condensation at pH values >4.5 produces particles with an oligodisperse diameter distribution. Increasing the temperature tends to produce smaller and more polydisperse particle diameters, and vice versa. Since the salt normally present in water also influences the size of the particles produced in the condensation, it is expedient to carry out the condensation in solutions made with deionized water.

Addition of, for example, 0.1% by weight or more salt to such a solution results in larger particles. At the same time, under conditions which otherwise result in particles with a monodisperse diameter distribution, there is increasing production of particles with an oligodisperse distribution. The effect of the salt is reduced as the chain length of the carboxylic acid increases. It is thus possible to obtain particles with a monodisperse diameter distribution with propionic acid even in the presence of up to 0.1% by weight of salt.

Altering the abovementioned parameters makes it possible to prepare dispersions of particles with the desired diameter, distribution thereof and solid content.

The formaldehyde liberated in the condensation of the melamine-formaldehyde precondensates can be trapped, e.g. in a known manner with ammonia at a pH above 7 to 8, or with urea or ethyleneurea.

It is particularly advantageous for the free formaldehyde in the dispersions obtained by the process of the present invention to be trapped by condensation with melamine.

For this, a suspension of melamine in water (ratio of melamine to water from 1:2 to 1:4) is continuously added to the dispersion of particles, which is still acid from the condensation, at from 60° to 90° C., preferably at from 70° to 85° C., at pH 4.0 to 5.0, with stirring, over the course of 1 to 2 hours, and the condensation is continued until the free formaldehyde is consumed.

Uniform mixing is essential for the condensation of the melamine-formaldehyde precondensate to give the dispersion. The mixing ought not to be turbulent and, moreover, no gas bubbles ought to be produced or stirred into the aqueous phase, because agglomerates of the fine particles or larger particles may be formed by such gas bubbles.

The dispersions obtained by the process can be dried, e.g. in a spray drier. The resulting powders contain no agglomerates and can easily be incorporated in systems containing Water and/or solvents. The dispersions from which all precondensate has been removed are particularly suitable for isolation by spray drying.

The process of the present invention will be further explained by the following examples. The percentages are by weight. PAMPS stands for poly-2-acrylamido-2-methylpropanesulfonic acid.

I. Methods of measurement

The methods indicated under 1. and 2. were used to determine the viscosity of the water-soluble polymers and the diameter and size distribution of the particles.

I.1. Viscosity determination

The viscosity of the water-soluble polymer with acid groups was measured on a 20% by weight solution at 25° C. and pH 7 in a ®Rheomat 30 at a shear rate of 489s$^{-1}$.

The K value was determined by the Fikentscher method (Cellulosechemie 13 (1932) 58 ff) on a 1% by weight solution in water.

I.2. Particle size determination

The diameter of the microparticles in the neutral dispersion after dilution with water was estimated under the microscope. Accurate determination was carried out with a Coulter counter. To determine the particle diameters and distribution thereof, the result from the Coulter counter was plotted, with the aid of a computer program, as a graph of the number of particles in a fraction against the relevant particle diameter, with the maximum being set at 100% in each case. The maximum yields the particle diameter of highest frequency $\phi_n$ (number average). The computer program was also used to plot a graph of the product of the number of particles and the 3rd power of the relevant average particle diameter of the fraction against the average particle diameter. The maximum ($=100\%$) on this graph yields the diameter of the microparticle volume of highest frequency, $\phi_{vol}$. The values of $\phi_n$ and $\phi_{vol}$ are identical in the case of a monodisperse particle distribution. The distribution of the microparticle diameters is evident from the graphs. The graph contains one rather sharp peak when the distribution is monodisperse and several peaks when it is oligodisperse. In order to gain information on the distribution range when the distribution plot was broad, the width of the curve was measured at 50% (half-width HW) and 90% of the maximum height of the curve and divided by the diameter of highest frequency, $\phi_n$: distribution range $Q=HW/\phi$. The particles are characterized by stating the calculated $Q_{50\ n}$, $Q_{50\ vol}$ and $Q_{90\ n}$, $Q_{90\ vol}$.

II. EXAMPLE

Example 1

1020 g of deionized water, 160 g of a 20% strength aqueous solution of sodium poly-2-acrylamido-2-methylpropanesulfonate (viscosity: 407 mPa.s, K value: 106.6) and 72.8 g of a 10% strength formic acid were mixed in a cylindrical 2 l glass reactor with propeller stirred and heated in a waterbath to 60° C. Then, with stirring (500 rpm), 172 g of a clear 70% aqueous solution of a partially methylated precondensate (from 1 mol of melamine and 5.25 mol of formaldehyde, containing 2.3 CH$_3$O groups per melamine molecule) were added all at once. Immediately after the addition, the solution had a pH of 3.62. The clear solution was stirred at 60° C. and, after about 3 min, became cloudy owing to precipitation of the condensate particles. The suspension of melamine resin particles was stirred at 60° C. for a further 2 h, during which there was complete condensation with consumption of the precondensate. The turbidity approached the final value asymptotically. The suspension had a pH of 3.96 and was adjusted with triethanolamine to pH 7.5 (14 g used) and cooled. The diameter of the separate spherical particles in the 7% dispersion estimated from examination under the microscope was less than 1 μm. Measurement in a Coulter counter yielded a diameter of $\phi_n=1.44$ μm (number average) or $\phi_{vol}=1.48$ μm with a diameter distribution of $Q_{vol\ 50}=0.30$ (HW$_{50}/\phi$vol) and $Q_{vol\ 90}=0.66$; i.e. the particles in the dispersion had a relatively narrow, almost monodisperse diameter distribution.

Example 2

The procedure was exactly as in Example 1 except that only 17.9 g, not 72.8 g, of 10% strength formic acid were added. The pH of the solution immediately after addition of the melamine-formaldehyde precondensate was 4.07. The solution became cloudy after 7 min. The dispersion was then cured for 3 hours, the temperature being raised after 1 hour to 80° C. in 30 min. The dispersion (pH =4.34) was neutralized with 7 g of triethanolamine and cooled. Examination under the microscope revealed spherical particles of identical size, i.e. monodisperse, with an estimated diameter of 2 to 3 μm. Measurement in a Coulter counter yielded a diameter $\phi_n$ of 3.14 μm or $\phi_{vol}$ of 3.13 μm, with a diameter distribution of $\phi_{n\ 50}=0.0446$ and $\phi_{vol\ 50}=0.083$ or $\phi_{n\ 90}=0.287$ and Q$\phi_{vol\ 90}=0.32$. Thus the particles show a very narrow, almost monodisperse distribution, while the particle diameter is larger than in Example 1. The particle diameter plot shows a sharp peak.

Example 3

3.1 Preparation of the dispersion.

The procedure was exactly as in Example 1, although only 4.73 g, not 72.8 g, of 10% strength formic acid were added. The pH immediately after addition of the melamine precondensate was 4.53. The initially clear solution became cloudy after 17 min. Condensation of the suspension was completed in 5 h, the temperature being increased after 2 h from 60° C. to 80° C. over the course of 1.5 h. At the end of the condensation, the mixture of pH 5 was neutralized with 2.2 g of triethanolamine and cooled. Examination under the microscope revealed separate spherical particles with various diameters in the range from 2 to 10 μm. The particle diameter of highest frequency determined in the Coulter counter was $\phi_n=7.63$ μm and $\phi_{vol}=9.31$ μm. Distribution range: $Q_n$ 5032 0.595; $Q_{vol\ 50}=0.50$; $Q_{vol\ 90}=1.31$. The diameter distribution plot showed a peak at $\phi_n=8.81$ μm; i.e. the particles had a bidisperse or bimodal distribution. According to the plot, 50% of the particles had a diameter $Q_n$ of from 5 to 10 μm, 90% of them up to 14 μm, and the remaining 10% had a diameter of from 14 to 20 μm. A sample of the dispersion was adjusted to pH 2.0 with dilute sulfuric acid and stirred at 60° C. for 2 h. There was no change in the particle diameter distribution, i.e. condensation of the suspension is complete.

3.2 Isolation of the particles 500 g of the obtained as in 3.1 were sprayed into a laboratory spray-drier with two-fluid nozzle at an inlet temperature of 130° C. The dispersion was metered in so that the temperature at the outlet from the drier was maintained at 65° C. A powder with a solids content of 98.5% was obtained. The powder was very light, almost dust-like. There was no adherent deposit on the glass spray and drying chamber of the spray drier. A sample of the powder was dispersed in water with a high-speed stirrer, and examination under the microscope revealed separate beads of the same size and distribution as in the initial dispersion.

Comparative Example 1

The procedure was exactly as in Example 3.1 although only 1148 g of deionized water was used in place of 1020 g of water and 160 g of the 20% strength solution of sodium poly-2-acrylamido-2-methylpropanesulfonate. The pH of the solution was adjusted to 4.53 as in Example 3.1 by adding 6.70 g of 10% strength formic acid. The clear solution became cloudy after 10 min. After a total of 25 min the mixture had coagulated to large, gelatinous lumps. The test was terminated. The comparative test shows that in the concentration of about 7% without the water-soluble polymer no stable dispersion is produced and thus no fine particles can be obtained.

Example 4

The procedure was exactly as in Example 3.1, although 320 g, not 160 g, of the 20% strength aqueous solution of sodium poly-2-acrylamido-2-methylpropanesulfonate were added. The mixture was adjusted to pH 4.54 with 5.90 g of 10% strength formic acid. The clear solution became cloudy after about 7.5 min, and condensation was continued for 4 h until the turbidity was constant and the pH was 4.85. After neutralization and cooling, examination under the microscope revealed separate spherical particles with diameters from 1 to 15 μm, and a few up to 25 μm. According to the Coulter counter, the highest frequency diameter $\phi_n$ of the particles in the dispersion was 4.17 μm, but there were also peaks at 7.27 μm and 24.3 μm. The plot of $\phi_{vol}$ revealed corresponding peaks for diameters at 7.56 μm, 9.5 μm and 24.3 μm; i.e. the dispersion had an oligodisperse distribution.

Example 5

The procedure was as in Example 1, although the formic acid was replaced by 40 g of 100% strength acetic acid. The pH of the solution was 3.64, increasing to 4.1 during the condensation. Neutralization and cooling resulted in a dispersion which, on the microscope, was composed of separate spherical particles with a diameter of from 1 to 3 μm. In the Coulter counter the highest frequency diameter was found to be $\phi_n=1.48$ μm or $\phi_{vol}=1.63$ μm with a particle diameter distribution of $Q_{n\,50}=0.288$ or $Q_{vol\,50}=0.573$.

Example 6

The procedure was as in Example 1, although the solution was adjusted to pH 4.00 with 11 g of 100% strength acetic acid. After the particles had precipitated, condensation of the suspension was continued for 3 h (final pH: 4.5), and it was then neutralized with triethanolamine and cooled. Examination under the microscope revealed separate spherical particles of identical size with an estimated diameter of 2 μm. According to the Coulter counter, the particles have a diameter of $\phi_n=\phi_{vol}=2.79$ μm. This identity indicates a narrow diameter distribution, with $Q_{n\,50}$ being found to be 0.087 and $Q_{n\,90}$ being 0.299, i.e. the particle distribution is virtually monodisperse.

Example 7

The procedure was as in Example 1, although the formic acid was replaced by 27 g of 10% strength acetic acid. The pH immediately after mixing was 4.38. The clear solution became cloudy 9 min after addition of the acid; condensation completed in 3 h, final pH: 4.9. Neutralization and cooling resulted in a dispersion which, under the microscope, contained separate spherical particles with a diameter of from 4 to 5 μm. Measurement in a Coulter counter showed that the highest frequency diameter was $\phi_n=4.60$ or $\phi_{vol}=4.90$ μm with a diameter distribution $Q_{vol\,50}=0.153$.

Example 8

The procedure was as in Example 1, although 100 g of 100% strength propionic acid were added in place of the formic acid. The pH after mixing was 3.78. Condensation was completed in 3 h at 60° C. Final pH: 4.1. After neutralization, examination under the microscope revealed separate spherical particles of about the same size with an estimated diameter of 2 μm. According to the Coulter counter, the highest frequency diameters were $\phi_n=1.5$ and $\phi_{vol}=1.75$ μm and the distribution range $Q_{vol\,50}$ was 0.48, i.e. a relatively narrow distribution.

Example 9

The procedure was as in Example 8, although the pH was adjusted to 4.08 by addition of 25 g of 100% strength propionic acid. The dispersion was cured at 60° C. for 2 h and at 80° C. for 2 h. Final pH: 4.47. Examination under the microscope revealed that the dispersion was composed of separate spherical particles of about the same size and a diameter of about 2 μm. Analysis in a Coulter counter yielded highest frequency diameters of $\phi_n=2.54$ μm and $\phi_{vol}=2.55$ μm with an additional peak at $\phi_n=3.05$ μm. The diameter distribution was narrow, $Q_{n\,50}$ being determined as 0.0980 and $Q_{n\,90}$ being 0.442.

Example 10

The procedure was as in Example 8, although the pH was adjusted to 4.35 with 65 g of 10% strength propionic acid, and the dispersion was cured at 60° C. for 4 h. The resulting dispersion contained separate spherical particles which had a diameter under the microscope of about 3 μm. The highest frequency particle diameter determined in the Coulter counter was $\phi_n=3.70$ or $Q_{vol}=3.76$ μm with a very narrow distribution of $Q_{vol\,50}=0.169$ and $Q_{vol\,90}=0.244$; i.e. the dispersion has an almost monodisperse distribution.

Example 11

The procedure was as in Example 10, although 2.44 g of sodium sulfate were added to the deionized water. The dispersion after completion of condensation revealed under the microscope separate spherical particles of diameters from 3 to 10 μm. Measurement in a Coulter counter yielded a highest frequency diameter of $\phi_n=5.55$ μm or 7.90 μm. The distribution plot showed 3 pronounced peaks in $\phi_n$ at 2.94 μm, 5.55 μm and 7.90 μm, and in $\phi_{vol}$ at 5.70 μm, 7.90 μm and 16.6 μm.

Example 12

The procedure was as in Example 11, although 2.81 g of calcium chloride dihydrate were added in place of sodium sulfate. Under the microscope the final dispersion contained separate spherical particles with estimated diameters from 3 to 12 μm. Measurement in a Coulter counter yielded a highest frequency diameter $\phi_n$ of 6.15 μm or $\phi_{vol}$ of 6.20 μm. The distribution plot revealed pronounced peaks at $\phi_n$ of 2.90, 6.15, 8.40 and 16.5 μm and $\phi_{vol}=6.20$, 8.40 and 16.5 μm. Thus an oligodisperse distribution of the diameters of the separate spherical particles can also be achieved by addition of salt.

Examples 13 and 14

Comparative Example 2

Comparative Example 2 and Examples 13 and 14 show the effect of the molecular weight and of the K value of sodium poly-2-acrylamido-2-methylpropanesulfonate (Na PAMPS) on the formation of the separate spherical particles. The procedure was exactly as in Example 2, although 160 g of the 20% strength solution of the sodium poly-2-acrylamido-2-methylpropanesulfonate indicated in Table 1 were used.

TABLE 1

|  | Na PAMPS (20% strength) | | Particle diameter |
|---|---|---|---|
|  | K value | Viscosity [mPa · s] | Microscope [μm] |
| Example 13 | 106.6 | 407 | 2–3, S; monodisperse |
| Example 14 | 123.4 | 806 | 1–2, S; monodisperse |
| Comparative Example 2 | 40 | — | lumps, no S* ∅ 8 μm |

S* single particles

It is evident from the Table that for the content of separate particles there is an optimum, which varies with the ratio of water-soluble polymer to precondensate and water, at a particular K value or molecular weight range of the Na PAMPS, and that the particle diameter decreases with increasing K value or molecular weight of the polymer. At high molecular weights this results in agglomeration of the excessively small particles. The range in which the resulting particles are monodisperse can be altered within limits by changing the amount of precondensate and polymer and the reaction parameters.

Example 15

1270 g of deionized water, 211 g of a 20% strength aqueous solution of sodium poly-2-acrylamido-2-methylpropanesulfonate (K value = 123, viscosity = 805 mPa.s) and 46 g of 9.84% strength formic acid were stirred at 60° C. in a cylindrical glass vessel (volume: 4 l, internal diameter: 15.5 cm) at 2000 rpm by a toothed disk stirrer of diameter 5 cm, and then 229 g of the solution of melamine-formaldehyde precondensate from Example 1 were added.

This resulted in a pH of 4.0. Despite a few air bubbles produced by the stirring being too rapid, the dispersion after condensation for 4 hours, during which the temperature was slowly raised from 60° C. to 85° C., was composed of separate particles. Final pH: 4.47. Neutralization with 30 g of triethanolamine and cooling resulted in a dispersion which contained separate spherical particles with an estimated diameter of from 1 to 2 μm in monodisperse distribution. Measurement in a Coulter counter yielded a highest frequency diameter of $\phi_n = \phi_{vol} = 1.54$ μm with a diameter distribution of $Q_n$ 50 = 0.182 or $Q_n$ 90 = 0.422. The solids content in the dispersion was 9.2%.

Example 16

16.1 Preparation

The procedure was as in Example 15, although 422 g, not 211 g, of Na PAMPS solution and 458 g, not 229 g, of the solution of melamine-formaldehyde precondensate were used. The pH was adjusted to 4.0 at the start of the condensation by adding 98 g of 9.84% strength formic acid. After condensation for 4 hours, a small sample was taken from the dispersion, which was still acidic, and was neutralized with triethanolamine. Solids content: 16.5%. Examination under the microscope revealed separate spherical particles of identical size with an estimated diameter of 2 μm. Measurement in a Coulter counter yielded a highest frequency particle diameter of $\phi_n = 2.78$ μm or $\phi_{vol} = 2.75$ μm and a particle diameter distribution of $Q_n$ 50 = $Q_{vol}$ 50 = 0.0576, i.e. a very narrow distribution.

16.2 Isolation 500 g of the dispersion from 16.1 were neutralized and sprayed into a laboratory spray-drier with a two-fluid nozzle at an inlet temperature of 130° C. The rate of feed of the dispersion was such that the temperature at the drier outlet was 70° C. 70 g of a very fine powder were obtained. The spray chamber of the drier was clean, i.e. there was no adherent deposit. The solids content of the powder was found to be 98%. A sample of the very light powder was taken up in a little water and dispersed with a high-speed stirrer. Examination under the microscope revealed separate particles with a diameter unchanged from that in the initial dispersion.

Example 17

Most of the completely condensed, still acidic dispersion from Example 16.1 (170 g) was heated to 79° C. and stirred at 500 rpm with a propeller stirrer. To remove free formaldehyde, a suspension of 76 g of melamine in 213 g of water was fed in at a constant rate over one hour, and the mixture was then stirred at 79° C. for one hour. It was then neutralized with triethanolamine and cooled. The resulting dispersion had a solids content of 20.8% and virtually no odor of formaldehyde. Examination under the microscope revealed separate spherical particles of identical size of about 2 to 3 μm. Measurement in a Coulter counter showed hardly any change from the particle size in Example 16.1: $\phi_n = 2.78$ μm and $\phi_{vol} = 2.80$ μm with a particle size distribution of $Q_n$ 50 = 0.0683 or $Q_{vol}$ 50 = 0.0685.

Example 18

1020 g of deionized water were mixed with 160 g of a 20% strength aqueous solution of sodium poly-2-acrylamido-2-methylpropanesulfonate (K value = 127.4, viscosity = 827 mPa.s) and 135 g of a 70% strength aqueous solution of a precondensate which was infinitely miscible with water without turbidity and was composed of 1 mol of melamine and 2.9 mol of formaldehyde and was partially etherified with 2.4 CH$_3$O groups per melamine molecule, at 38° C. in a cylindrical 2 l glass vessel with propeller stirrer rotating at 500 rpm. Then 78 g of a 10% strength aqueous propionic acid solution were added to produce a pH of 4.50, and condensation of the clear solution started. The solution became cloudy after 20 min. Condensation of the suspension was completed at 38° to 40° C. for 4 h and at 20° C. for one hour. The resulting dispersion was neutralized with triethanolamine and cooled. Solids content: 9.0%. Examination under the microscope revealed separate spherical particles of the same size, estimated at 2 to 3 μm. The highest frequency diameter was measured in a Coulter counter at $\phi_n = 2.58$ or $\phi_{vol} = 2.60$. The distribution was narrow, as indicated by the diameter distribution of $Q_{n\ 50} = 0.143$ or $Q_{vol\ 90} = 0.526$.

Example 19

The procedure was as in Example 18, with the following modifications:
a) the blade stirrer rotated at 25 rpm;
b) 12 g of 10% strength formic acid were added to pH 4.80 in place of propionic acid.

The temperature was maintained at 38° to 40° C. After condensation was complete, the resulting dispersion had a solids content of 13.7% and contained, according to examination under the microscope, separate spherical particles with a diameter of about 6 to 7 μm. Measurement in a Coulter counter yielded a highest frequency particle diameter of $\phi_n = 10.42$ μm or $\phi_{vol} = 10.66$ μm. Also found were a smaller peak at $\phi_n = 7.4$ μm or $\phi_{vol}\ 7.67$ μm and an even smaller peak at $\phi_n = 5.07$ μm. The distribution was thus oligodisperse. The diameter distribution was determined at $Q_{n\ 50} = 0.184$ or $Q_{vol\ 50} = 0.257$.

Example 20

The procedure was as in Example 1. 1270 g of deionized water, 200 g of an aqueous solution of sodium poly-2-acrylamido-2-methylpropanesulfonate and 340 g of a solution of partially methylated precondensate of melamine and formaldehyde were stirred at 800 rpm and heated to 44° C. in a vessel. The mixture was then adjusted to pH 4.2 with 6% strength formic acid. Further formic acid was added gradually to maintain the pH at 4.2 over 2 h. A total of 120 g of 6% strength formic acid was required. The mixture was then heated to 80° C. within half an hour and maintained at this for 1.5 h. Condensation of the dispersion was then complete. After cooling, the pH was adjusted to 7.8 with 10% strength sodium hydroxide solution. Examination of the dispersion under a microscope revealed separate spherical particles all with a diameter of 11 μm. The dispersion was dried in a spray drier at an inlet temperature of 125° C. and an outlet temperature of 65° C. This resulted in the microparticles as a dust-like powder.

Example 21

2540 g of deionized water, 500 g of a 20% strength aqueous solution of sodium poly-2-acrylamido-2methylpropanesulfonate (viscosity: 407 mPa.s, K value: 106.6) and 120 g of 10% strength formic acid were heated to 47° C. in a cylindrical 5 l glass reactor with propeller stirrer in a waterbath. Then, with stirring (500 rpm), 640 g of a clear 70% aqueous solution of a partially methylated precondensate (from 1 mol of melamine and 5.25 mol of formaldehyde, containing 2.3 CH$_3$O groups per melamine molecule) were added all at once. The solution had a pH of 4.2 immediately after the addition. The clear solution was stirred at 47° to 50° C. The pH was maintained at 4.2 by slow addition of a total of 60 g of 6% strength formic acid. 2 1/4 h after addition of the precondensate, the temperature of the resulting suspension was raised to 60° C. in 30 min and condensation was completed at this temperature (duration: 1½ h). The suspension was neutralized with 10% strength sodium hydroxide solution and allowed to cool to room temperature.

The suspension had a solids content of 7.7%. Examination under the microscope revealed separate spherical particles with diameters from 3 to 30 μm, the diameter of highest frequency being 15 μm.

3800 g of the resulting suspension were dried as in Example 16 in a laboratory spray-drier at a gas inlet temperature of 125° C. and a gas outlet temperature of 77° C. Yield: 270 g of a dust-like powder, which can be converted into a dispersion in water which contains only separate particles with no change in the diameter distribution.

Use Example 1

1400 g of grinding oil composed of 8.0% olein, 5.78% ammonia (25%), 5.8% alcohol (96%), 5.8% mineral oil, 57.5% water and 17.3% Neuenburg chalk was mixed in a 2 l stainless steel container with 140 g of an oligodisperse particle powder of average diameter 4 to 10 μm (Example 11, the capsules were dried as in Example 3.2), and the mixture was homogenized in a disperser.

The resulting grinding and polishing paste was applied at about 20 g/m² onto the surface of a PE molding which was then rubbed by hand in a conventional manner, exerting light pressure, with a fabric pad. A smooth glossy surface had been produced after about 10 min.

Use Example 2

140 g of a lanolin cream (based on glycerol, water, boric acid, peanut oil and lanolin) were mixed with 28 g of powder-like formaldehyde-free microbeads with a distribution diameter from 4 to 10 μm (Example 11). The resulting paste was applied to an area of callosity on the skin and rubbed vigorously. After a short time the callous layers had been removed, leaving a smooth and soft area of skin.

Use Example 3

250 g of monodisperse spherical particles of diameter about 5 μm (from Example 7) were mixed with 1000 g of a coating for photographic paper using a propeller stirrer for 20 min. This coating was applied at 5 g/m² (solid) to a photographic paper and cured with an electron beam. The coating was then matt and velvet-like. Application of water to the coating produced no change after 30 min, i.e. the matt coating did not absorb water.

Carrying out the above procedure but using 250 g of calibrated starch (diameter: 25 μm) in place of the monodisperse particles likewise resulted in a matt coating after drying. Application of water to this coating resulted in the film becoming swollen and cloudy, and thus susceptible to scratching, after 30 min.

We claim:

1. A process for the preparation of spherical, hard mono- or oligodisperse particles which have diameters of from 0.1 to 100 μm, which consists essentially of condensing
   a) in an aqueous solution of a water-soluble polymer with sulfo groups and a viscosity of from 200 to 3000 mPa.s at a shear rate of 489 S$^{-1}$ (measured at 25° C. in 20% by weight aqueous solution at pH 7.0).
(b) a melamine-formaldehyde precondensate which is partially etherified with $C_1$–$C_4$-alkanols, forms a clear solution in water in every ratio and has a melamine to formaldehyde molar ratio of from 1:3 to 1:6, at pH 3 to 6,
c) at from 20° to 100° C.,
d) neutralizing the dispersion and allowing it to cool and
e) isolating the particles if required.

2. A process as claimed in claim 1, wherein the formaldehyde present in the aqueous dispersion is removed by reaction with melamine suspended in water at pH 2 to 6 and at from 60° to 100° C.

3. A process as claimed in claim 1, wherein the aqueous solution contains a homo- or copolymer of 2-acrylamido-2-methylpropanesulfonic acid.

4. A process as claimed in claim 1, wherein the aqueous solution contains from 1 to 10% by weight, based on the solution, of the polymer with sulfo groups.

5. A process as claimed in claim 1, wherein the ratio of polymer to melamine-formaldehyde precondensate is from 0.05:1 to 0.7:1.

6. The process of claim 1, wherein said water-soluble polymer with sulfo groups is a copolymer or homopolymer of sulfoethyl (meth)acrylate, sulfopropyl (meth)acrylate, vinyl-sulfonic acid, maleimidie-N-ethanesulfonic acid or 2-acrylamideo-2-methjylpropanesulfonic acid, which maybe in the form of the free acid, alkali metal salt or tertiary ammonium salt.

7. The process of claim 1, wherein said water-soluble polymer with sulfo groups is copolymer of (a) one or more members selected from the group consisting of sulfoethyl (meth)acrylate, sulfopropyl (meth)acrylate, vinylsulfonic acid, maleimide-N-ethanesulfonic acid and 2-acrylamideo-2-methylpropanesulfonic acid; and (b) one or more members selected from the group consisting of $C_1$–$C_3$-alkyl acrylates, hydroxy-$C_2$–$C_4$-alkyl acrylates, N-vinylpyrrolidone, acrylonitrile, and acrylic acid.

* * * * *